(12) United States Patent
Zhang et al.

(10) Patent No.: US 10,177,561 B2
(45) Date of Patent: Jan. 8, 2019

(54) SELECTIVE PROTECTION CIRCUIT AND METHOD, AND POWER SUPPLY SYSTEM

(71) Applicant: Huawei Technologies Co., Ltd., Shenzhen (CN)

(72) Inventors: Zhenxing Zhang, Shenzhen (CN); Jiansheng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/676,196

(22) Filed: Aug. 14, 2017

(65) Prior Publication Data
US 2017/0346275 A1   Nov. 30, 2017

Related U.S. Application Data

(63) Continuation of application No. PCT/CN2015/083003, filed on Jun. 30, 2015.

(30) Foreign Application Priority Data

Feb. 15, 2015   (CN) .......................... 2015 1 0082383

(51) Int. Cl.
*H02H 7/26*   (2006.01)
*H02J 9/00*   (2006.01)
(Continued)

(52) U.S. Cl.
CPC ............ *H02H 7/267* (2013.01); *G05F 3/205* (2013.01); *H01H 73/18* (2013.01); *H01H 83/10* (2013.01);
(Continued)

(58) Field of Classification Search
CPC ................................. H02H 7/267; H02H 3/07
(Continued)

(56) References Cited

U.S. PATENT DOCUMENTS

| 5,864,458 A | 1/1999 | Duffy et al. |
| 7,005,995 B2 * | 2/2006 | Hornsby ............... G01R 31/086 |
| | | 324/510 |

(Continued)

FOREIGN PATENT DOCUMENTS

| CN | 1200844 A | 12/1998 |
| CN | 101515758 A | 8/2009 |

(Continued)

*Primary Examiner* — Qutbuddin Ghulamali
(74) *Attorney, Agent, or Firm* — Leydig, Voit & Mayer, Ltd.

(57) ABSTRACT

A selective protection circuit includes a current-limiting module and a control module, where the current-limiting module includes a switch unit, and the switch unit includes a first end, a second end, and a control end; the first end is connected to a positive electrode of a bus voltage of an HVDC power supply, and the second end is connected to a positive electrode of a power supply of a voltage pre-regulator circuit in a load branch connected to the current-limiting module; the control end is connected to the control module; and the control module is configured to output a control signal to the control end when a value of a total current flowing through the switch unit is greater than or equal to a preset threshold, so as to switch off the switch unit.

18 Claims, 11 Drawing Sheets

(51) Int. Cl.
  *G05F 3/20*    (2006.01)
  *H01H 73/18*   (2006.01)
  *H01H 83/10*   (2006.01)
  *H02H 3/07*    (2006.01)
  *H02M 1/088*   (2006.01)

(52) U.S. Cl.
  CPC .............. *H02H 3/07* (2013.01); *H02J 9/00* (2013.01); *H02J 9/005* (2013.01); *H02M 1/088* (2013.01)

(58) Field of Classification Search
  USPC ........................................ 340/638, 292, 635
  See application file for complete search history.

(56) References Cited

U.S. PATENT DOCUMENTS

| | | | |
|---|---|---|---|
| 7,391,299 B2* | 6/2008 | Bender | G06Q 10/06 340/292 |
| 7,612,654 B2* | 11/2009 | Bender | G06Q 10/06 340/292 |
| 2002/0080544 A1 | 6/2002 | Pellegrino | |
| 2009/0212726 A1 | 8/2009 | Baudesson et al. | |

FOREIGN PATENT DOCUMENTS

| | | |
|---|---|---|
| CN | 202906431 U | 4/2013 |
| CN | 203466740 U | 3/2014 |
| CN | 203561907 U | 4/2014 |
| CN | 104617653 A | 5/2015 |
| EP | 3185384 A1 | 6/2017 |
| JP | 2004282964 A | 10/2004 |
| WO | 9710636 A2 | 3/1997 |

\* cited by examiner

SELECTIVE PROTECTION CIRCUIT AND METHOD, AND POWER SUPPLY SYSTEM

CROSS-REFERENCE TO RELATED APPLICATIONS

This application is a continuation of International Application No. PCT/CN2015/083003, filed on Jun. 30, 2015, which claims priority to Chinese Patent Application No. 201510082383.6, filed on Feb. 15, 2015. The disclosures of the aforementioned applications are hereby incorporated by reference in their entireties.

TECHNICAL FIELD

The present application relates to the field of circuit protection technologies, and in particular, to a selective protection circuit and method and a power supply system.

BACKGROUND

In recent years, with a continuous increase in power of a communications device and a requirement for being energy-efficient in the communications industry, a high-voltage direct current High-Voltage Direct Current (HVDC) power supply is gradually used to supply power to a data center and a communications equipment room. Therefore, an HVDC technology is developing rapidly in the communications field.

However, as power supply voltages in the data center and the communications equipment room increase, when a load branch connected using a power supply link short-circuits, short circuit currents in the load branch and the power supply link also continuously increase. An excessively high short circuit current may cause a power outage in some important communications devices.

SUMMARY

Embodiments of the present application provide a selective protection circuit and method and a power supply system, so as to resolve a problem that an excessively high short circuit current may cause a power outage in some important communications devices.

To achieve the foregoing objective, the following technical solutions are used in the embodiments of the present application:

A first aspect provides a selective protection circuit that is applied to a scenario in which a high-voltage direct current HVDC power supply is used to supply power, where the HVDC power supply supplies power to at least two parallel load branches, and each load branch includes one voltage pre-regulator circuit; the selective protection circuit includes a current-limiting module and a control module, where the current-limiting module includes a switch unit, and the switch unit includes a first end, a second end, and a control end;

the first end is connected to a positive electrode of a bus voltage of the HVDC power supply, and the second end is connected to a positive electrode of a power supply of a voltage pre-regulator circuit in a load branch connected to the current-limiting module; or the first end is connected to a negative electrode of a bus voltage of the HVDC power supply, and the second end is connected to a negative electrode of a power supply of a voltage pre-regulator circuit in a load branch connected to the current-limiting module;

the control end is connected to the control module; and the control module is configured to output a control signal to the control end when a value of a total current flowing through the switch unit is greater than or equal to a preset threshold, so as to switch off the switch unit, where the preset threshold is greater than a maximum value of a normal operating current flowing through the switch unit.

With reference to the first aspect, in a first possible implementation manner, the current-limiting module is located in a first load branch of the at least two load branches, and the load branch connected to the current-limiting module is the first load branch; or the at least two load branches are connected to the HVDC power supply by using at least two power distribution units PDUs, the current-limiting module is located in a first PDU of the at least two PDUs, and the load branch connected to the current-limiting module is a load branch connected to the first PDU.

With reference to the first aspect or the first possible implementation manner of the first aspect, in a second possible implementation manner, the current-limiting module further includes a unidirectional conduction unit and an inductor, and when the unidirectional conduction unit is on, a current flowing through the unidirectional conduction unit flows in a direction from a positive electrode of the unidirectional conduction unit to a negative electrode of the unidirectional conduction unit;

the positive electrode of the unidirectional conduction unit is connected to the negative electrode of the power supply of the voltage pre-regulator circuit in the load branch connected to the current-limiting module;

the negative electrode of the unidirectional conduction unit is connected to the positive electrode of the power supply of the voltage pre-regulator circuit in the load branch connected to the current-limiting module; and one end of the inductor is connected to the negative electrode of the unidirectional conduction unit, and the other end is connected to the positive electrode of the power supply of the voltage pre-regulator circuit in the load branch connected to the current-limiting module.

With reference to the second possible implementation manner of the first aspect, in a third possible implementation manner, the current-limiting module is located in the first load branch of the at least two load branches, and when the voltage pre-regulator circuit is a boost boost circuit, the inductor is integrated with an inductor of the voltage pre-regulator circuit.

With reference to the second possible implementation manner or the third possible implementation manner of the first aspect, in a fourth possible implementation manner, the control module is further configured to output another control signal to the control end after a first preset time period after the switch unit is switched off, so that the switch unit enters a hiccup current-limiting state, where the first preset time period is less than or equal to a time period in which the inductor supplies, when the switch unit is switched off and by using electric energy stored in the inductor, power to a load in the load branch connected to the current-limiting module.

With reference to the first aspect, in a fifth possible implementation manner, a bus of the HVDC power supply supplies power to the control module.

With reference to the first aspect, in a sixth possible implementation manner, the switch unit is a field effect transistor or a power transistor.

A second aspect provides a selective protection method that is applied to a scenario in which a high-voltage direct current HVDC power supply is used to supply power, where the HVDC power supply supplies power to at least two parallel load branches, and each load branch includes one voltage pre-regulator circuit; and the method includes:

detecting a value of a total current flowing through a target channel, where the target channel refers to a channel between a positive electrode of a bus voltage of the HVDC power supply and a positive electrode of a power supply of a voltage pre-regulator circuit in one load branch of the at least two load branches, or a channel between a negative electrode of a bus voltage of the HVDC power supply and a negative electrode of a power supply of a voltage pre-regulator circuit in one load branch of the at least two load branches; and when the value of the total current is greater than or equal to a preset threshold, controlling to shut down the target channel, where the preset threshold is greater than a maximum value of a normal operating current flowing through the target channel.

With reference to the second aspect, in a first possible implementation manner, after the controlling to shut down the target channel, the method further includes:

after a first preset time period, controlling to periodically conduct and shut down the target channel, where the first preset time period and a time period in which the target channel is shut down during periodic conduction and shutdown of the target channel are less than or equal to a time period in which there is no power outage in a load in a load branch connected using the target channel, when the target channel is shut down.

With reference to the first possible implementation manner of the second aspect, in a second possible implementation manner, after the controlling to periodically conduct and shut down the target channel, the method further includes:

after a second preset time period, when the value of the total current is still greater than or equal to the preset threshold, controlling to shut down the target channel; or after a second preset time period, when the value of the total current is less than the preset threshold, controlling to conduct the target channel, where the second preset time period is greater than or equal to duration of a power-on phase of the target channel.

With reference to the second aspect, in a third possible implementation manner, the controlling to shut down the target channel includes:

after a third preset time period, if the value of the total current is still greater than or equal to the preset threshold, controlling to shut down the target channel, where the third preset time period is greater than or equal to duration of a lightning current in the target channel.

A third aspect provides a power supply system, including a high-voltage direct current HVDC power supply, where the HVDC power supply supplies power to at least two parallel load branches, and each load branch includes one voltage pre-regulator circuit; and the power supply system further includes any selective protection circuit provided in the first aspect.

According to the selective protection circuit and method and the power supply system that are provided in the embodiments of the present application, when a load branch connected to a current-limiting module in the selective protection circuit short-circuits, and a short circuit current flowing through a switch unit of the current-limiting module is greater than or equal to a preset threshold, a control module in the selective protection circuit can control to switch off the switch unit, thereby rapidly cutting off a circuit, and preventing a problem that an excessively high short circuit current flowing through the switch unit causes a power outage in some important communications devices.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

In addition, the character "/" in this specification generally indicates an "or" relationship between the associated objects. In addition, the term "multiple" in this specification refers to two or more.

An embodiment of the present application provides a selective protection circuit A that is applied to a scenario in which an HVDC power supply is used to supply power. The HVDC power supply supplies power to at least two parallel load branches, and each load branch includes one voltage pre-regulator circuit. FIG. 1, FIG. 2, FIG. 3, and FIG. 4 show schematic structural diagrams of a power supply system. The power supply system includes the selective protection circuit A, and the selective protection circuit A includes a current-limiting module 10 and a control module 11. The current-limiting module 10 includes a switch unit 101, and the switch unit 101 includes a first end 1011, a second end 1012, and a control end 1013.

Figure 1:
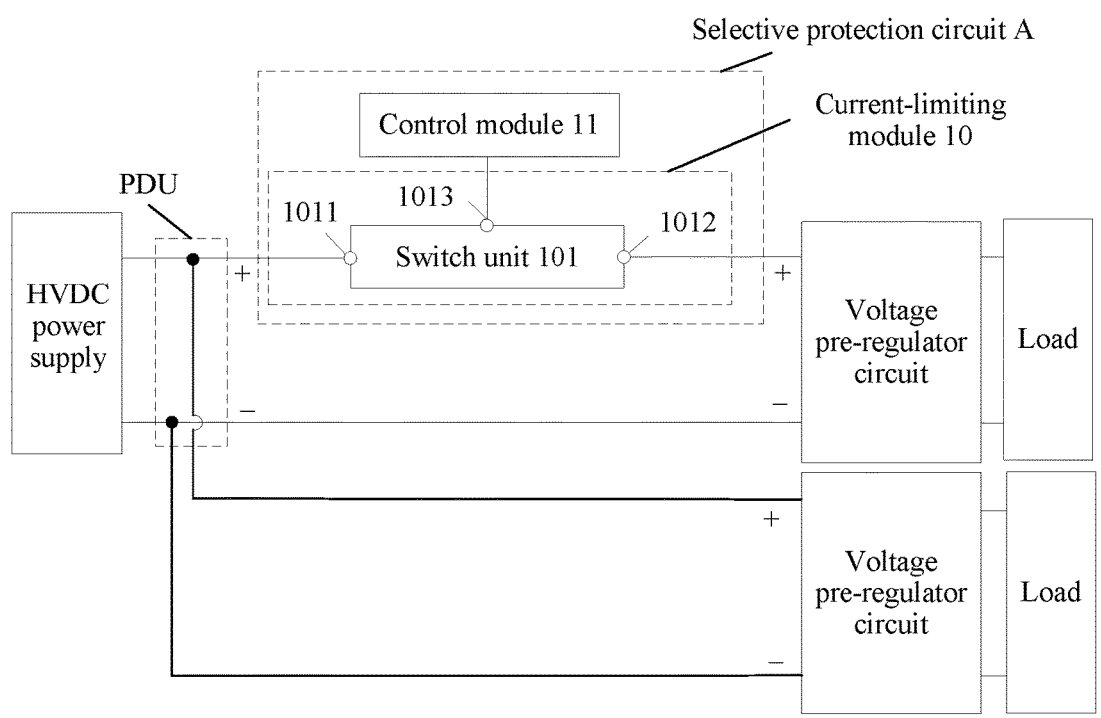
FIG. 1 is a schematic structural diagram of a power supply system according to an embodiment of the present application.
Figure 2:
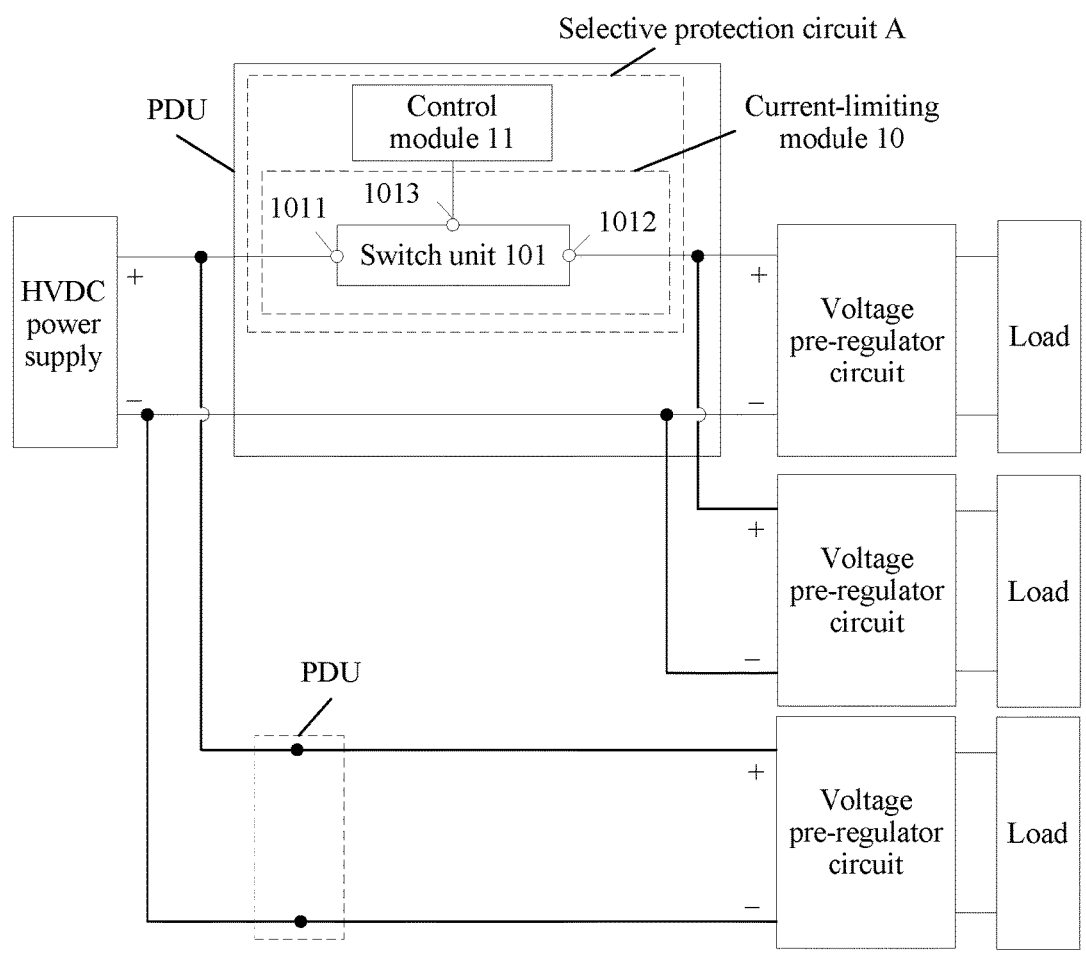
FIG. 2 is a schematic structural diagram of another power supply system according to an embodiment of the present application.
Figure 3:
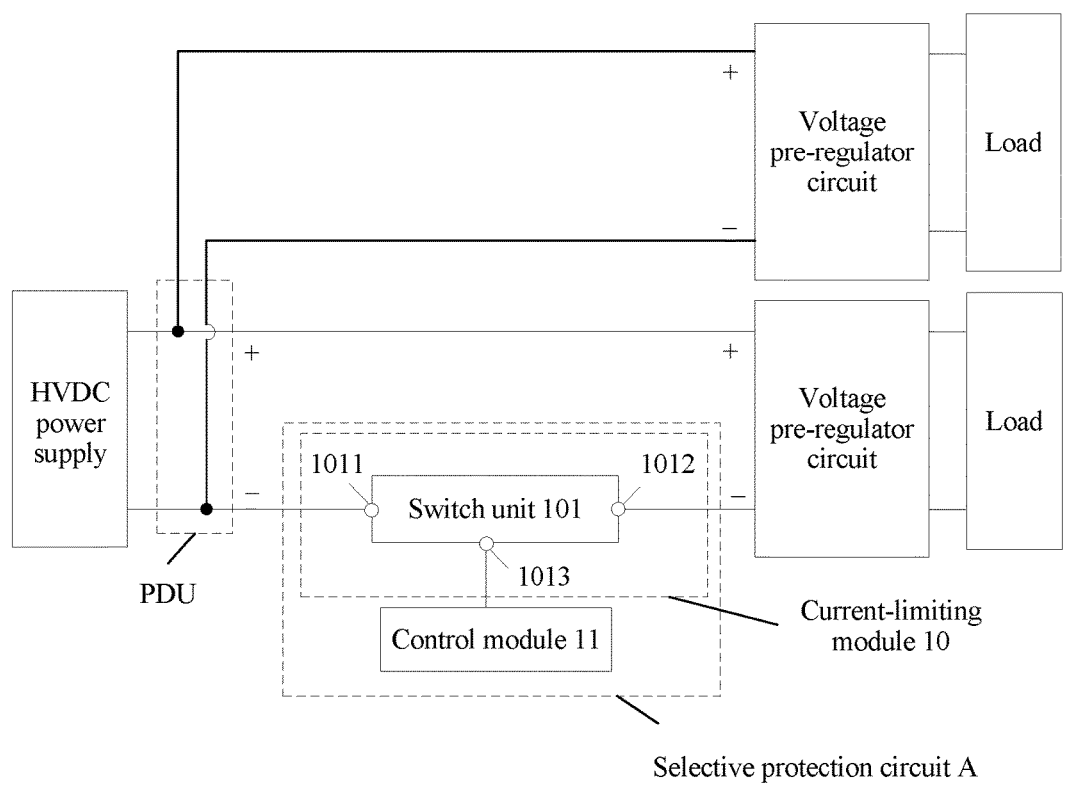
FIG. 3 is a schematic structural diagram of another power supply system according to an embodiment of the present application.
Figure 4:
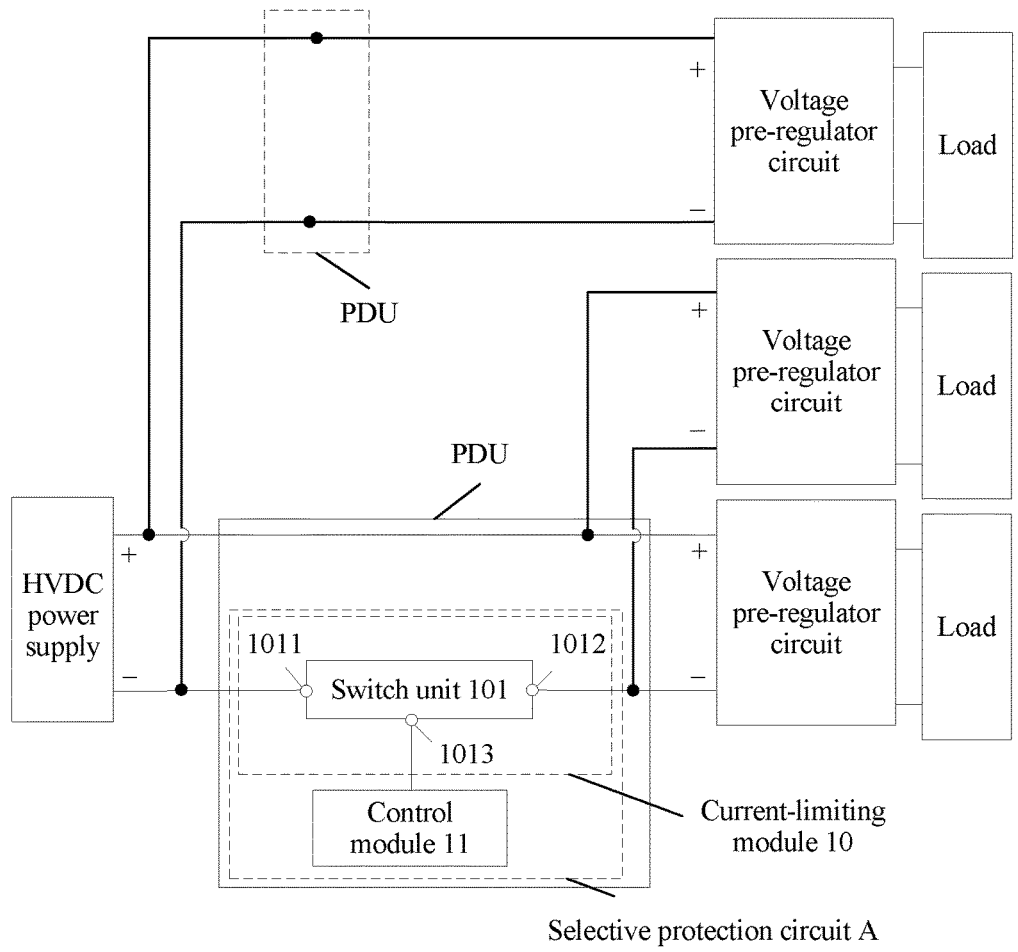
FIG. 4 is a schematic structural diagram of another power supply system according to an embodiment of the present application.

As shown in FIG. 1 and FIG. 2, the first end 1011 is connected to a positive electrode of a bus voltage of the HVDC power supply, and the second end 1012 is connected to a positive electrode of a power supply of a voltage pre-regulator circuit in a load branch connected to the current-limiting module 10. Alternatively, as shown in FIG. 3 and FIG. 4, the first end 1011 is connected to a negative electrode of a bus voltage of the HVDC power supply, and the second end 1012 is connected to a negative electrode of a power supply of a voltage pre-regulator circuit in a load branch connected to the current-limiting module 10.

As shown in FIG. 1, FIG. 2, FIG. 3, and FIG. 4, the control end 1013 is connected to the control module 11.

The control module 11 is configured to output a control signal to the control end 1013 when a value of a total current flowing through the switch unit 101 is greater than or equal to a preset threshold, so as to switch off the switch unit 101. The preset threshold is greater than a maximum value of a normal operating current flowing through the switch unit 101.

The control module 11 may be specifically a microcontroller. The selective protection circuit A provided in this embodiment of the present application may be applied to a power supply link or a load branch that carries a relatively high current, or may be applied to a power supply link or a load branch that carries a medium or low current.

According to the selective protection circuit provided in this embodiment of the present application, when a load branch connected to a current-limiting module in the selective protection circuit short-circuits, and a short circuit current flowing through a switch unit of the current-limiting module is greater than or equal to a preset threshold, a control module in the selective protection circuit can control to switch off the switch unit, thereby rapidly cutting off a circuit, and preventing a problem that an excessively high short circuit current flowing through the switch unit causes a power outage in some important communications devices.

Optionally, as shown in FIG. 1 and FIG. 3, the current-limiting module 10 is located in a first load branch of the at least two load branches, and the load branch connected to the current-limiting module 10 is the first load branch.

Alternatively, as shown in FIG. 2 and FIG. 4, the at least two load branches are connected to the HVDC power supply by using at least two PDUs (Power Distribution Unit, power distribution unit), the current-limiting module 10 is located in a first PDU of the at least two PDUs, and the load branch connected to the current-limiting module 10 is a load branch connected to the first PDU.

Specifically, when the current-limiting module 10 is located in the first load branch of the at least two load branches, "the maximum value of the normal operating current of the switch unit 101" refers to a maximum current value when the first load branch operates normally. When the current-limiting module 10 is located in the first PDU of the at least two PDUs, "the maximum value of the normal operating current of the switch unit 101" refers to a maximum current value when the first PDU operates normally.

It should be noted that both FIG. 1 and FIG. 3 are described by using an example in which one load branch of two load branches includes the selective protection circuit A, and a load branch in which the selective protection circuit A is located in FIG. 1 and FIG. 3 is the first load branch. FIG. 2 and FIG. 4 show two PDUs separately, where one PDU is connected to two load branches, and the other PDU is connected to one load branch. Both FIG. 2 and FIG. 4 are described by using an example in which one PDU of two PDUs includes the selective protection circuit A, and a PDU connected to two load branches is the first PDU.

It should be noted that the selective protection circuit A provided in this embodiment of the present application may be applied to a load branch or to a power supply link that includes a multi-level protection part, for example, a power supply link that includes a two-level or three-level protection part. A power supply link in which an HVDC power supply is used to supply power to a load may exclude a PDU, or may include a PDU. A PDU is configured to distribute power to a load branch. When a power supply link includes multiple PDUs, the multiple PDUs are connected in parallel. One PDU may be connected to one load branch or may be connected to multiple parallel load branches. When a power supply link excludes a PDU, the current-limiting module 10 may be located in one load branch of the at least two load branches, or all load branches. When a power supply link includes a PDU, the current-limiting module 10 may be located in a load branch, or may be located in the PDU. Specifically, the current-limiting module 10 may be located in all load branches or PDUs, or may be located in some load branches or PDUs. In addition, between the HVDC power supply and the PDU, there may further be an MDF (Main Distribution Frame, main distribution frame), a PDF (power distribution frame, Power Distribution Frame), or the like. This part is not drawn in the accompanying drawings in the embodiments of the present application. FIG. 6 to FIG. 11 in the embodiments of the present application are all schematic structural diagrams of a power supply system, and all use an example, in which a power supply link includes one PDU and the PDU is connected to two parallel load branches, to describe a selective protection circuit A provided in the embodiments of the present application.

For example, a voltage pre-regulator circuit may be a boost circuit. For details, refer to FIG. 10 or FIG. 11.

Specifically, the control module 11 may include a current sampling unit. The current sampling unit is configured to detect, in real time, the value of the total current flowing through the switch unit 101. The control module 11 may further include a port circuit. The port circuit is configured to output a control signal to the control end 1013 of the switch unit 101, so as to switch on or switch off the switch unit 101.

Figure 5:
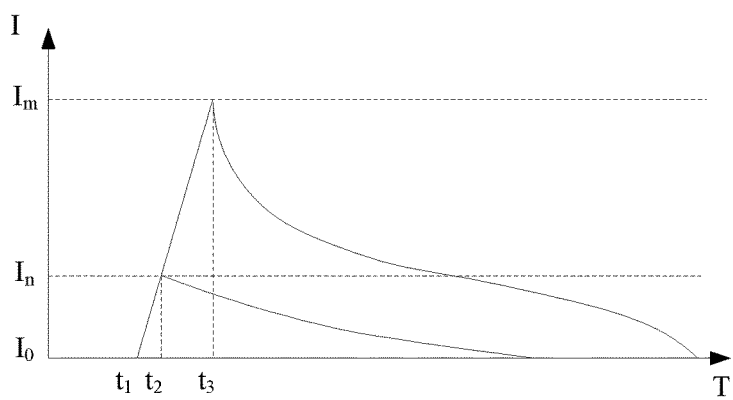
FIG. 5 is a schematic diagram of a current-time curve for a load branch when the load branch short-circuits according to an embodiment of the present application.

It should be noted that, as shown in FIG. 5, an axis x in the figure represents time, an axis y represents a value of a total current of the load branch connected to the current-limiting module 10, $I_0$ represents a value of a total current when the load branch operates normally, $I_n$ represents the preset threshold, and $I_m$ represents a value of an expected total short circuit current of the load branch. When the load branch short-circuits at a moment $t_1$, a value of a total current of the load branch may rise in an excessively short time period from $t_1$ to $t_3$ and reach an excessively large value $I_m$. In the solution provided in this embodiment of the present application, the control module 11 may detect, in real time, the value of the total current flowing through the switch unit 101, and when detecting that the value of the total current is greater than or equal to the preset threshold $I_n$, output a control signal to the control end 1013 at a moment $t_2$, so as to switch off the switch unit 101. In this case, the value of the total current of the load branch connected to the current-limiting module 10 is less than $I_n$.

Optionally, the switch unit 101 may be a field effect transistor or a power transistor. The field effect transistor may be an N-channel field effect transistor or a P-channel field effect transistor.

Specifically, when the switch unit 101 is an N-channel field effect transistor, if the first end 1011 is connected to the positive electrode of the bus voltage of the HVDC power supply, and the second end 1012 is connected to the positive electrode of the power supply of the voltage pre-regulator circuit in the load branch connected to the current-limiting module 10, the first end 1011 is a drain of the field effect transistor, the second end 1012 is a source of the field effect transistor, and the control end 1013 is a gate of the field effect transistor. If the first end 1011 is connected to the negative electrode of the bus voltage of the HVDC power supply, and the second end 1012 is connected to the negative electrode of the power supply of the voltage pre-regulator circuit in the load branch connected to the current-limiting module 10, the first end 1011 is a source of the field effect transistor, the second end 1012 is a drain of the field effect transistor, and the control end 1013 is a gate of the field effect transistor.

When the switch unit 101 is a P-channel field effect transistor, if the first end 1011 is connected to the positive electrode of the bus voltage of the HVDC power supply, and the second end 1012 is connected to the positive electrode of the power supply of the voltage pre-regulator circuit in the load branch connected to the current-limiting module 10, the first end 1011 is a source of the field effect transistor, the second end 1012 is a drain of the field effect transistor, and the control end 1013 is a gate of the field effect transistor. If the first end 1011 is connected to the negative electrode of the bus voltage of the HVDC power supply, and the second end 1012 is connected to the negative electrode of the power supply of the voltage pre-regulator circuit in the load branch connected to the current-limiting module 10, the first end 1011 is a drain of the field effect transistor, the second end 1012 is a source of the field effect transistor, and the control end 1013 is a gate of the field effect transistor.

When the switch unit 101 is a power transistor, if the first end 1011 is a collector of the power transistor, the second end 1012 is an emitter of the power transistor. If the first end 1011 is an emitter of the power transistor, the second end 1012 is a collector of the power transistor. The control end 1013 is a base of the power transistor.

Figure 6:
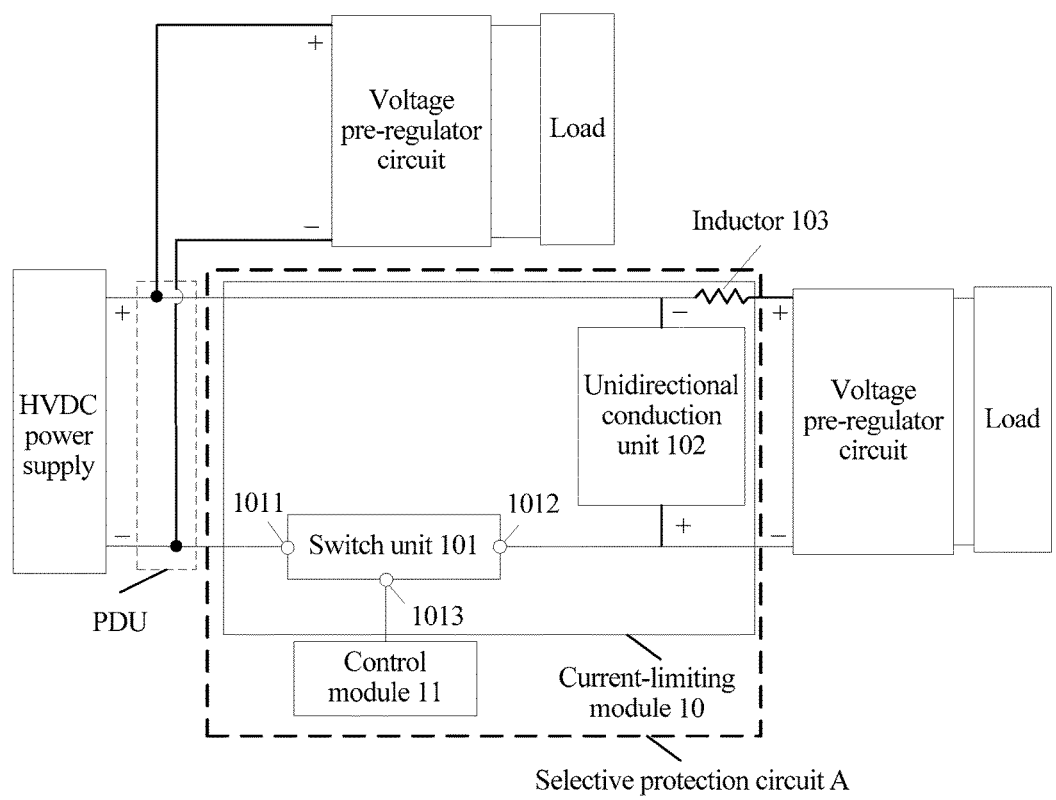
FIG. 6 is a schematic structural diagram of another power supply system according to an embodiment of the present application.
Figure 7:
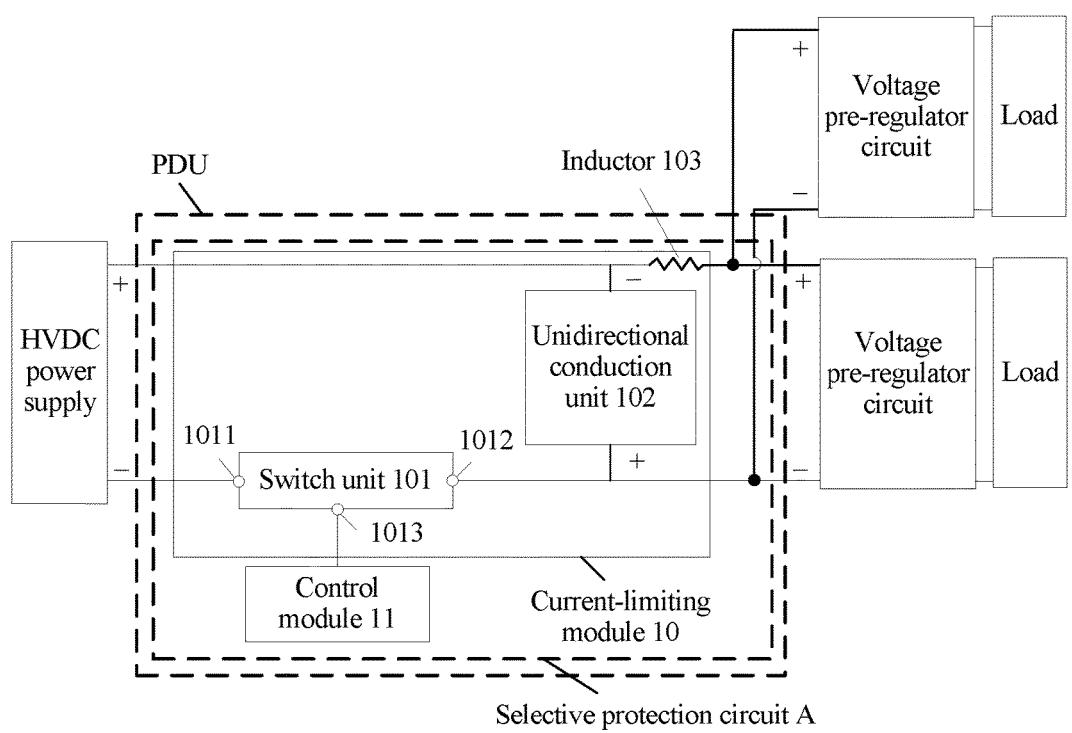
FIG. 7 is a schematic structural diagram of another power supply system according to an embodiment of the present application.

Optionally, as shown in FIG. 6 and FIG. 7, the current-limiting module 10 further includes a unidirectional conduction unit 102 and an inductor 103. When the unidirectional conduction unit 102 is on, a current flowing through the unidirectional conduction unit 102 flows in a direction from a positive electrode of the unidirectional conduction unit 102 to a negative electrode of the unidirectional conduction unit 102.

The positive electrode of the unidirectional conduction unit 102 is connected to the negative electrode of the power supply of the voltage pre-regulator circuit in the load branch connected to the current-limiting module 10.

The negative electrode of the unidirectional conduction unit 102 is connected to the positive electrode of the power supply of the voltage pre-regulator circuit in the load branch connected to the current-limiting module 10.

One end of the inductor 103 is connected to the negative electrode of the unidirectional conduction unit 102, and the other end is connected to the positive electrode of the power supply of the voltage pre-regulator circuit in the load branch connected to the current-limiting module 10.

After the switch unit 101 is switched off, the inductor 103 may supply power to a load in a load branch by using the unidirectional conduction unit 102.

Specifically, in FIG. 6, an example of this optional solution is described based on FIG. 3, and in FIG. 7, an example of this optional solution is described based on FIG. 4.

Specifically, the unidirectional conduction unit 102 may be a diode. In addition, the unidirectional conduction unit 102 may also be a field effect transistor, a power transistor, or the like. In this case, unidirectional conductivity of the unidirectional conduction unit 102 may be controlled by using the control module 11. The field effect transistor may be an N-channel field effect transistor or a P-channel field effect transistor.

Specifically, when the unidirectional conduction unit 102 is an N-channel field effect transistor, the positive electrode of the unidirectional conduction unit 102 is a source of the field effect transistor, the negative electrode of the unidirectional conduction unit 102 is a drain of the field effect transistor, and the control module 11 may output a control signal to a gate of the field effect transistor, so as to control to conduct or shut down the unidirectional conduction unit 102.

When the unidirectional conduction unit 102 is a P-channel field effect transistor, the positive electrode of the unidirectional conduction unit 102 is a drain of the field effect transistor, the negative electrode of the unidirectional conduction unit 102 is a source of the field effect transistor, and the control module 11 may output a control signal to a gate of the field effect transistor, so as to control whether to conduct the unidirectional conduction unit 102.

When the unidirectional conduction unit 102 is a power transistor, the positive electrode of the unidirectional conduction unit 102 is a collector of the power transistor, and the negative electrode is an emitter of the power transistor; or the positive electrode of the unidirectional conduction unit 102 is an emitter of the power transistor, and the negative electrode is a collector of the power transistor. The control module 11 may output a control signal to a base of the power transistor, so as to control whether to conduct the unidirectional conduction unit 102.

Optionally, the control module 11 is further configured to output another control signal to the control end 1013 after a first preset time period after the switch unit 101 is switched off, so that the switch unit 101 enters a hiccup current-limiting state. The first preset time period is less than or equal to a time period in which the inductor 103 supplies, when the switch unit 101 is switched off and by using electric energy stored in the inductor 103, power to a load in the load branch connected to the current-limiting module 10. Specifically, the hiccup current-limiting state means that the switch unit 101 is in a state of being periodically switched on and switched off. A period of the hiccup current-limiting state refers to time required by the control module 11 to control to switch on and switch off the switch unit 101 once. The period of the hiccup current-limiting state is related to an inductance value of the inductor 103. When the switch unit 101 is in the hiccup current-limiting state and the switch unit 101 is switched off, the inductor 103 supplies power to a load by using the unidirectional conduction unit 102. It should be noted that when the unidirectional conduction unit 102 is a field effect transistor or a power transistor, the switch unit 101 enters the hiccup current-limiting state, and the switch unit 101 is switched off, the control module 11 controls to conduct the unidirectional conduction unit 102.

It should be noted that, in a power-on phase of a load branch and a power supply link (that is, a phase from a time when the HVDC power supply just supplies power to the load branch to a time when the load branch operates normally), a startup inrush current exists in the load branch and the power supply link. The startup inrush current has a relatively large current value and endures for a relatively long time.

In this case, after the control module 11 controls the switch unit 101 to enter the hiccup current-limiting state, and after a second preset time period, when detecting that the total current flowing through the switch unit 101 is still greater than or equal to the preset threshold, the control module 11 controls to switch off the switch unit 101; or after a second preset time period, when detecting that the value of the total current flowing through the switch unit 101 is less than the preset threshold, the control module 11 controls to switch on the switch unit 101.

The second preset time period is greater than duration of the power-on phase of the load branch and the power supply link. After the second preset time period, when detecting that the value of the total current flowing through the switch unit 101 is still greater than or equal to the preset threshold, the control module 11 may consider that the detected current is a short circuit current of the load branch connected to the current-limiting module 10. Alternatively, after the second preset time period, when detecting that the value of the total current flowing through the switch unit 101 is less than the preset threshold, the control module 11 may consider that the detected current is a startup inrush current in the load branch connected to the current-limiting module 10.

When a circuit is in a normal operating state and the load branch connected to the current-limiting module 10 short-circuits, when the control module 11 controls to switch off the switch unit 101, the current-limiting module 10 may exclude the unidirectional conduction unit 102 and the inductor 103. When the control module 11 controls to switch off the switch unit 101 and controls, after the first preset time period, the switch unit 101 to enter the hiccup current-limiting state, the current-limiting module 10 may include the unidirectional conduction unit 102 and the inductor 103, so that when the switch unit 101 enters the hiccup current-limiting state and the switch unit 101 is switched off, the inductor 103 supplies power to a load by using the unidirectional conduction unit 102.

When the power supply system that supplies power to a load branch is in a normal operating state and suffers a lightning strike, a lightning current may exist in a power supply link or a load branch in which the switch unit 101 is located, resulting in a relatively high current flowing through the switch unit 101, but the lightning current disappears within an excessively short time. In this case, when the control module 11 detects that the value of the total current flowing through the switch unit 101 is greater than or equal to the preset threshold, after a third preset time period, if the control module 11 detects that the value of the total current flowing through the switch unit 101 is still greater than or equal to the preset threshold, the control module 11 controls to switch off the switch unit 101. The third preset time period is greater than duration of the lightning current.

After the third preset time period, if the control module 11 detects that the value of the total current flowing through the switch unit 101 is still greater than or equal to the preset threshold, the control module 11 may consider that the detected current is the short circuit current of the load branch connected to the current-limiting module 10, and therefore the control module 11 controls to switch off the switch unit 101 of the current-limiting module 10. Alternatively, after the third preset time period, if the control module 11 detects that the value of the total current flowing through the switch unit 101 is less than the preset threshold, the control module 11 may consider that the detected current is a current flowing through the switch unit 101 when a lightning current exists in the power supply link or the load branch in which the switch unit 101 is located, and therefore the control module 11 may perform no operation.

Figure 8:
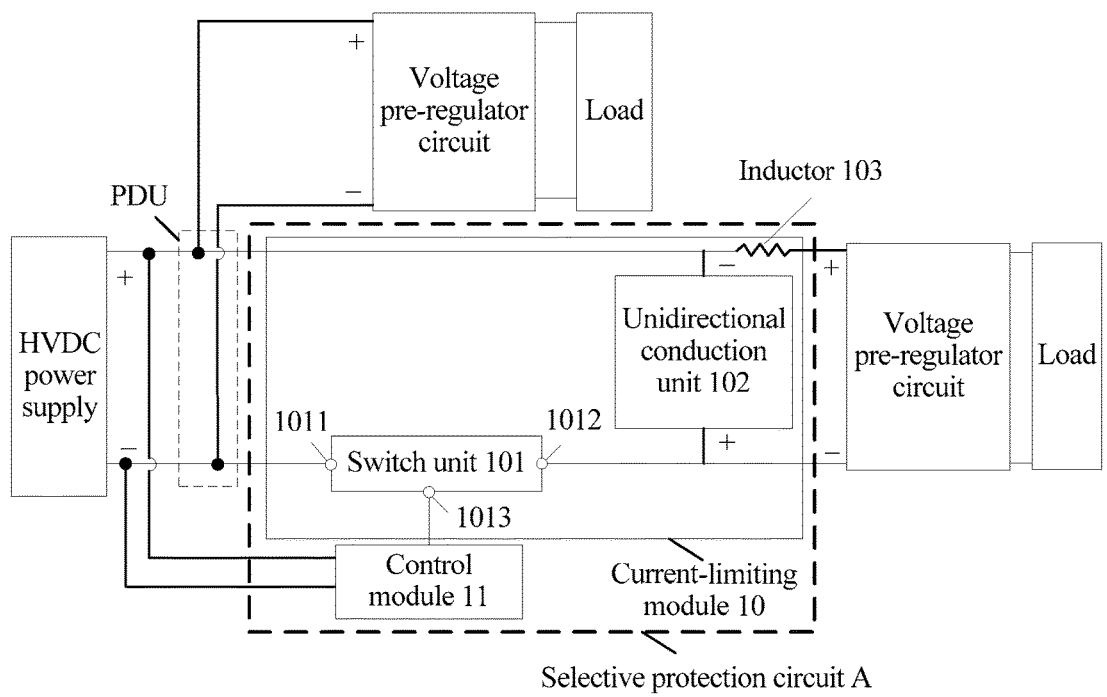
FIG. 8 is a schematic structural diagram of another power supply system according to an embodiment of the present application.
Figure 9:
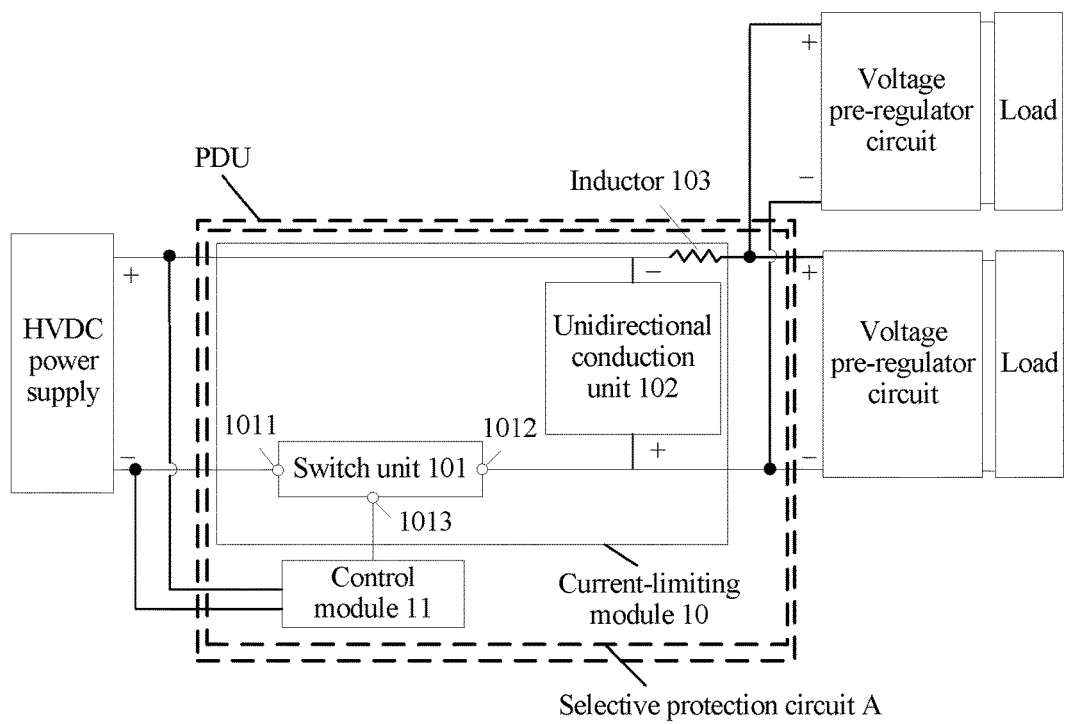
FIG. 9 is a schematic structural diagram of another power supply system according to an embodiment of the present application.

Optionally, as shown in FIG. 8 and FIG. 9, a bus of the HVDC power supply may supply power to the control module 11. Specifically, a power supply of the control module 11 may also be an independent power supply. This is not limited in this embodiment of the present application.

Specifically, in FIG. 8, an example of this optional solution is described based on FIG. 6, and in FIG. 9, an example of this optional solution is described based on FIG. 7.

Optionally, the current-limiting module 10 is located in the first load branch of the at least two load branches, and when the voltage pre-regulator circuit is a boost boost circuit, the inductor 103 is integrated with an inductor of the voltage pre-regulator circuit.

Specifically, when the current-limiting module 10 is located in a load branch, the current-limiting module 10 and a voltage pre-regulator circuit in the load branch may be designed together. For example, when the voltage pre-regulator circuit is a boost circuit, a designer may learn of an inductance value of an inductor of the boost circuit, and therefore may determine the period of the hiccup current-limiting state. In this case, the current-limiting module 10 may include only the switch unit 101 and the unidirectional conduction unit 102, and the inductor 103 may be replaced with the inductor of the boost circuit. When the current-limiting module 10 is located in a PDU, the current-limiting module 10 and a voltage pre-regulator circuit in a load branch connected to the PDU are designed independently. Therefore, a designer cannot learn of parameters of the voltage pre-regulator circuit in the load branch connected to the PDU and all parts in the voltage pre-regulator circuit. Therefore, when the current-limiting module 10 is located in a PDU, the current-limiting module 10 needs to include both the unidirectional conduction unit 102 and the inductor 103.

Figure 10:
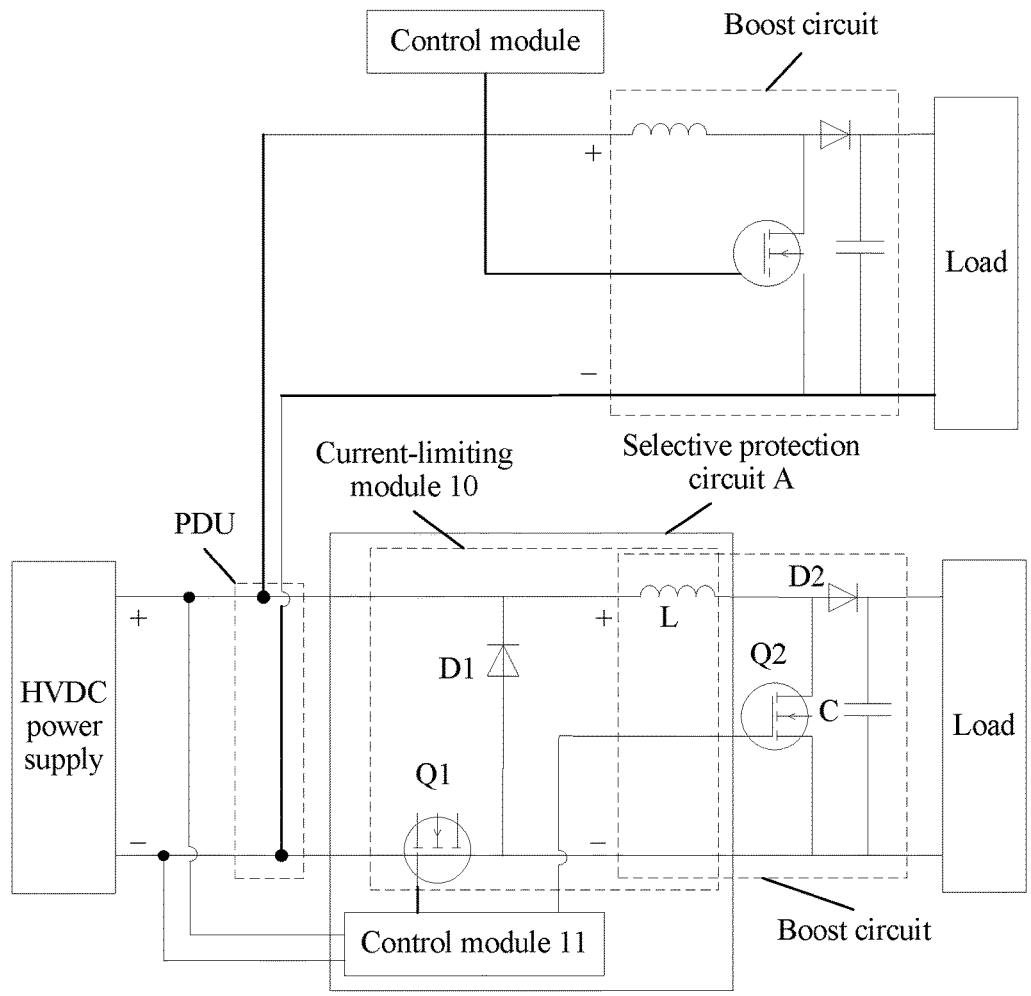
FIG. 10 is a schematic structural diagram of another power supply system according to an embodiment of the present application.

Specifically, as shown in FIG. 10, when a bus of the HVDC power supply supplies power to the control module 11, the voltage pre-regulator circuit is a boost circuit, the unidirectional conduction unit 102 is a diode D1, and the switch unit 101 is an N-channel field effect transistor Q1, the selective protection circuit A may be that shown in FIG. 10. The N-channel field effect transistor Q1, the diode D1, an inductor L in the boost circuit, and a capacitor C in the boost circuit form a buck circuit. The boost circuit and the buck circuit share the inductor L. Specifically, in FIG. 10, an example of this optional solution is described based on FIG. 8.

Figure 11:
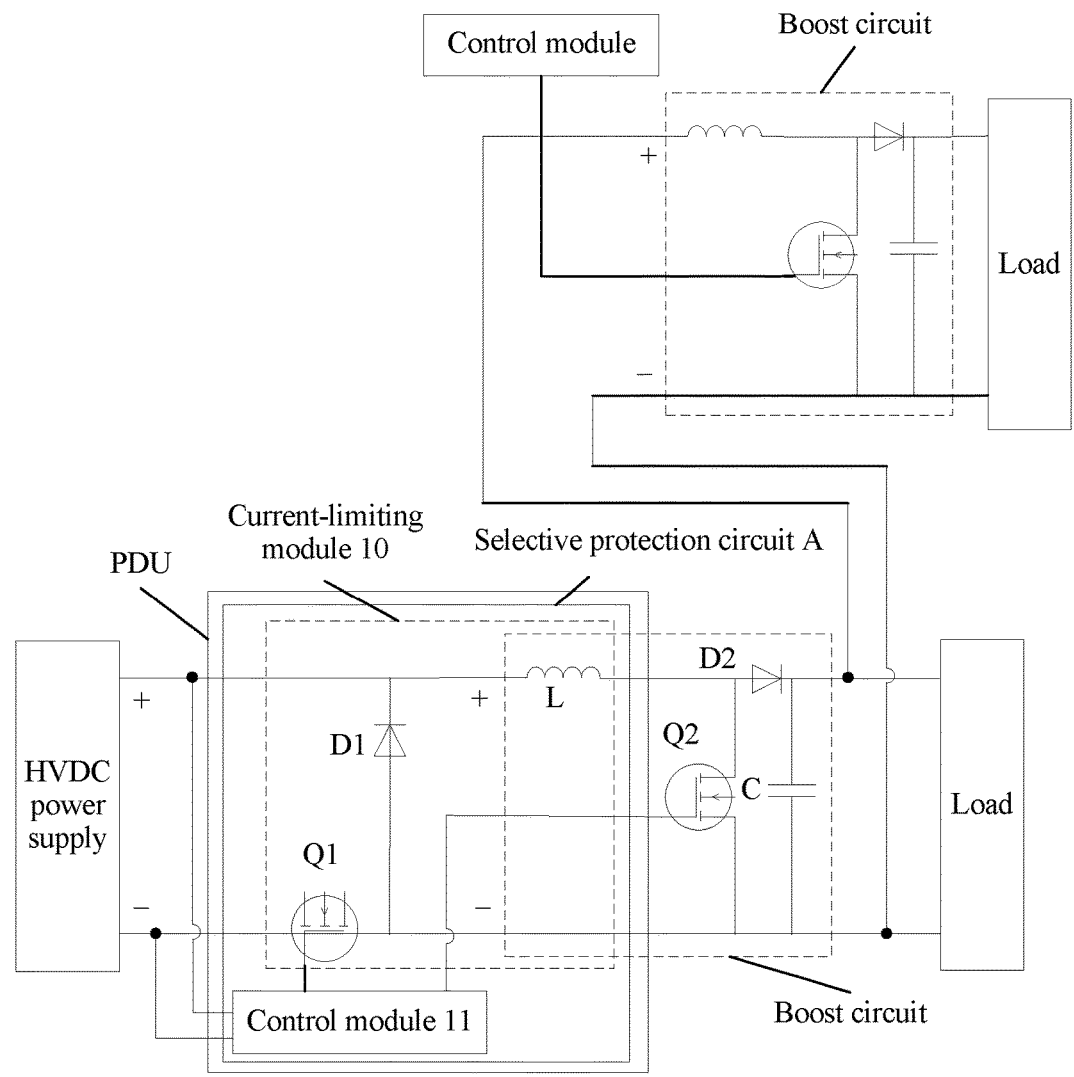
FIG. 11 is a schematic structural diagram of still another power supply system according to an embodiment of the present application.

In addition, as shown in FIG. 11, the current-limiting module 10 is located in the first PDU of the at least two PDUs. When the bus of the HVDC power supply supplies power to the control module 11, the voltage pre-regulator circuit is a boost circuit, the unidirectional conduction unit 102 is a diode D1, and the switch unit 101 is an N-channel field effect transistor Q1, the selective protection circuit A may be that shown in FIG. 11. Specifically, in FIG. 11, an example of this optional solution is described based on FIG. 9.

In the prior art, when an HVDC power supply is connected to multiple load branches, because the multiple load branches are connected in parallel, a current of a power supply bus increases when one load branch short-circuits and a protection part in the load branch is not tripped. Because there is a resistance in the power supply bus, a voltage of the power supply bus increases. Therefore, a voltage (that is, a bus voltage) provided for another load branch by using the power supply bus decreases. Therefore, the bus voltage instantaneously drops in a process from a time when the load branch short-circuits to a time when the protection part in the load branch is tripped. In addition, when the load branch short-circuits and a short circuit current is excessively high, if the protection part has a limited breaking capability, a case such as a breaking failure or sticking easily occurs on the protection part, resulting in a fire or a component burst. However, in the selective protection circuit A provided in this embodiment of the present application, when detecting that a value of a total current flowing through a switch unit 101 reaches a preset threshold, a control module 11 may control to switch off the switch unit 101, to prevent a short circuit current from rising to an excessively large value. In this way, a voltage provided by a bus voltage for another load branch does not instantaneously drop, and a case such as a breaking failure or sticking may be prevented from occurring on a protection part.

Figure 12:
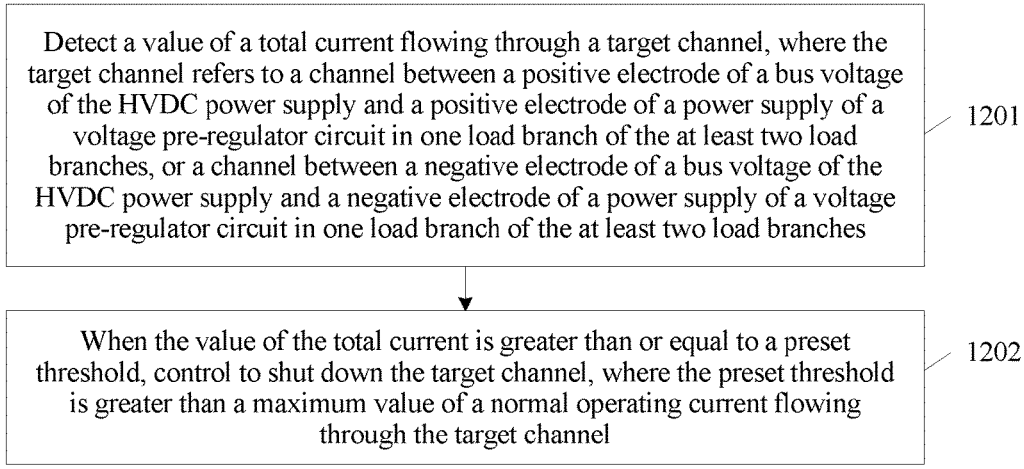
FIG. 12 is a flowchart of a selective protection method according to an embodiment of the present application.

An embodiment of the present application further provides a selective protection method that is applied to a scenario in which a high-voltage direct current HVDC power supply is used to supply power. The HVDC power supply supplies power to at least two parallel load branches, and each load branch includes one voltage pre-regulator circuit. The method may be specifically applied to the selective protection circuit provided in the foregoing embodiment. As shown in FIG. 12, the method includes:

1201. Detect a value of a total current flowing through a target channel, where the target channel refers to a channel between a positive electrode of a bus voltage of the HVDC power supply and a positive electrode of a power supply of a voltage pre-regulator circuit in one load branch of the at least two load branches, or a channel between a negative electrode of a bus voltage of the HVDC power supply and a negative electrode of a power supply of a voltage pre-regulator circuit in one load branch of the at least two load branches.

It should be noted that this embodiment may be executed by a control module in the selective protection circuit. For explanation related to this embodiment, refer to the foregoing embodiment.

Specifically, during specific implementation of step 1201, the control module may detect, in real time, the value of the total current flowing through the target channel.

1202. When the value of the total current is greater than or equal to a preset threshold, control to shut down the target channel, where the preset threshold is greater than a maximum value of a normal operating current flowing through the target channel.

In the selective protection method provided in this embodiment of the present application, when a load branch connected using a target channel short-circuits, and a short circuit current flowing through the target channel is greater than or equal to a preset threshold, the target channel is controlled to shut down, thereby rapidly cutting off a circuit, and preventing a problem that an excessively high short circuit current flowing through the target channel causes a power outage in some important communications devices.

Optionally, after step 1202 is performed, the method may further include: after a first preset time period, controlling to periodically conduct and shut down the target channel, where the first preset time period and a time period in which the target channel is shut down during periodic conduction and shutdown of the target channel are less than or equal to a time period in which there is no power outage in a load in a load branch connected using the target channel, when the target channel is shut down.

It should be noted that, in a process of controlling to periodically conduct and shut down the target channel, during shutdown of the target channel, an inductor in the selective protection circuit may supply power to a load in a load branch by using a unidirectional conduction unit.

It should be noted that, in a power-on phase of a load branch and a power supply link (that is, a phase from a time when the HVDC power supply just supplies power to the load branch to a time when the load branch operates normally), a startup inrush current exists in the load branch and the power supply link. Therefore, a startup inrush current also exists in the target channel. The startup inrush current has a relatively large current value and endures for a relatively long time. In this case, optionally, after the controlling to periodically conduct and shut down the target channel, the method may further include: after a second preset time period, when the value of the total current is still greater than or equal to the preset threshold, controlling to shut down the target channel; or after a second preset time period, when the value of the total current is less than the preset threshold, controlling to conduct the target channel. The second preset time period is greater than or equal to duration of a power-on phase of the target channel.

After the second preset time period, when detecting that the value of the total current flowing through the target channel is still greater than or equal to the preset threshold, the control module may consider that the detected current is a short circuit current of a load branch connected to the target channel. Alternatively, after the second preset time period, when detecting that the value of the total current flowing through the target channel is less than the preset threshold, the control module may consider that the detected current is a startup inrush current in the target channel.

When a power supply system that supplies power to a load branch is in a normal operating state and suffers a lightning strike, a lightning current may exist in the target channel, resulting in a relatively high current in the target channel, but the lightning current disappears within an excessively short time. In this case, optionally, step 1202 includes: after a third preset time period, if the value of the total current is still greater than or equal to the preset threshold, controlling to shut down the target channel, where the third preset time period is greater than or equal to duration of a lightning current in the target channel.

After the third preset time period, if the control module detects that the value of the total current flowing through the target channel is still greater than or equal to the preset threshold, the control module may consider that the detected current is the short circuit current of the load branch connected to the target channel, and therefore the control module controls to shut down the target channel. Alternatively, after the third preset time period, if the control module detects that the value of the total current flowing through the target channel is less than the preset threshold, the control module may consider that the detected current is a current in the target channel when a lightning current exists in the target channel, and therefore the control module may perform no operation.

An embodiment of the present application further provides a power supply system, including a high-voltage direct current HVDC power supply. The HVDC power supply supplies power to at least two parallel load branches, and each load branch includes one voltage pre-regulator circuit; and the power supply system includes any one of the selective protection circuits A provided in the foregoing embodiments.

Specifically, the power supply system may be that shown in FIG. 1, FIG. 2, FIG. 3, and FIG. 4.

According to the power supply system provided in this embodiment of the present application, the power supply system includes a selective protection circuit. When a load branch connected to a current-limiting module in the selective protection circuit short-circuits, and a short circuit current flowing through a switch unit of the current-limiting module is greater than or equal to a preset threshold, a control module in the selective protection circuit can control to switch off the switch unit, thereby rapidly cutting off a circuit, and preventing a problem that an excessively high short circuit current flowing through the switch unit causes a power outage in some important communications devices.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A selective protection circuit, comprising:
    a current-limiting circuit; and
    a control circuit,
    wherein the selective protection circuit is included in a power supply that supplies power to at least two parallel load branches, wherein each load branch of the at least two parallel load branches comprises one voltage pre-regulator circuit;
    wherein the current-limiting circuit comprises a switch unit, and the switch unit comprises a first end, a second end, and a control end;
    wherein the first end is connected to a positive electrode of a bus voltage of the power supply, and the second end is connected to a positive electrode of a power supply of a voltage pre-regulator circuit in a load branch connected to the current-limiting circuit; or the first end is connected to a negative electrode of a bus voltage of the power supply, and the second end is connected to a negative electrode of a power supply of a voltage pre-regulator circuit in a load branch connected to the current-limiting circuit;
    wherein the control end is connected to the control circuit; and
    wherein the control circuit is configured to output a control signal to the control end when a value of a total current flowing through the switch unit is greater than or equal to a preset threshold, so as to switch off the switch unit, wherein the preset threshold is greater than a maximum value of an operating current flowing through the switch unit.

2. The selective protection circuit according to claim 1, wherein:
    the current-limiting circuit is located in a first load branch of the at least two parallel load branches, and a load branch connected to the current-limiting circuit is the first load branch; or
    the at least two parallel load branches are connected to the power supply by using at least two power distribution units (PDUs), the current-limiting circuit is located in a first PDU of the at least two PDUs, and a load branch connected to the current-limiting circuit is the load branch connected to the first PDU.

3. The selective protection circuit according to claim 1, wherein
    the current-limiting circuit further comprises a unidirectional conduction unit and an inductor, and when the unidirectional conduction unit is on, a current flowing through the unidirectional conduction unit flows in a direction from a positive electrode of the unidirectional conduction unit to a negative electrode of the unidirectional conduction unit;
    the positive electrode of the unidirectional conduction unit is connected to the negative electrode of the power supply of the voltage pre-regulator circuit in the load branch connected to the current-limiting circuit;
    the negative electrode of the unidirectional conduction unit is connected to the positive electrode of the power supply of the voltage pre-regulator circuit in the load branch connected to the current-limiting circuit; and
    one end of the inductor is connected to the negative electrode of the unidirectional conduction unit, and the other end is connected to the positive electrode of the power supply of the voltage pre-regulator circuit in the load branch connected to the current-limiting circuit.

4. The selective protection circuit according to claim 3, wherein the current-limiting circuit is located in a first load branch of the at least two parallel load branches, and when the voltage pre-regulator circuit is a boost circuit, the inductor is integrated with an inductor of the voltage pre-regulator circuit.

5. The selective protection circuit according to claim 3, wherein:
    the control circuit is further configured to output another control signal to the control end after a first preset time period after the switch unit is switched off, so that the switch unit enters a hiccup current-limiting state, wherein the first preset time period is less than or equal to a time period in which the inductor supplies, when the switch unit is switched off and by using electric energy stored in the inductor, power to a load in the load branch connected to the current-limiting circuit.

6. The selective protection circuit according to claim 1, wherein:
    a bus of the power supply supplies power to the control circuit.

7. The selective protection circuit according to claim 1, wherein the switch unit is a field effect transistor or a power transistor.

8. A method, applied to a scenario in which a power supply is used to supply power, wherein the power supply supplies power to at least two parallel load branches, and each load branch of the at least two parallel load branches comprises one voltage pre-regulator circuit; and the method comprises:

detecting a value of a total current flowing through a target channel, wherein the target channel refers to a channel between a positive electrode of a bus voltage of the power supply and a positive electrode of a power supply of a voltage pre-regulator circuit in one load branch of the at least two parallel load branches, or a channel between a negative electrode of a bus voltage of the power supply and a negative electrode of a power supply of a voltage pre-regulator circuit in one load branch of the at least two parallel load branches; and in response to the value of the total current being greater than or equal to a preset threshold, controlling to shut down the target channel, wherein the preset threshold is greater than a maximum value of an operating current flowing through the target channel.

9. The method according to claim 8, wherein after the controlling to shut down the target channel, the method further comprises:

after a first preset time period, controlling to periodically conduct and shut down the target channel, wherein both the first preset time period and a time period in which the target channel is shut down during periodic conduction and shutdown of the target channel are less than or equal to a time period in which there is no power outage in a load in a load branch connected using the target channel, when the target channel is shut down.

10. The method according to claim 9, wherein after the controlling to periodically conduct and shut down the target channel, the method further comprises:

after a second preset time period, when the value of the total current is still greater than or equal to the preset threshold, controlling to shut down the target channel; or after a second preset time period, when the value of the total current is less than the preset threshold, controlling to conduct the target channel, wherein the second preset time period is greater than or equal to duration of a power-on phase of the target channel.

11. The method according to claim 8, wherein the controlling to shut down the target channel comprises:

after a third preset time period, if the value of the total current is still greater than or equal to the preset threshold, controlling to shut down the target channel, wherein the third preset time period is greater than or equal to duration of a lightning current in the target channel.

12. A power supply system, comprising:
a selective protection circuit; and
a power supply, wherein the power supply supplies power to at least two parallel load branches, and each load branch of the at least two parallel load branches comprises one voltage pre-regulator circuit;

wherein the selective protection circuit comprises a current-limiting circuit and a control circuit, wherein the current-limiting circuit comprises a switch unit, and the switch unit comprises a first end, a second end, and a control end;

wherein the first end is connected to a positive electrode of a bus voltage of the power supply, and the second end is connected to a positive electrode of a power supply of a voltage pre-regulator circuit in a load branch connected to the current-limiting circuit; or the first end is connected to a negative electrode of a bus voltage of the power supply, and the second end is connected to a negative electrode of a power supply of a voltage pre-regulator circuit in a load branch connected to the current-limiting circuit;

wherein the control end is connected to the control circuit; and wherein the control circuit is configured to output a control signal to the control end when a value of a total current flowing through the switch unit is greater than or equal to a preset threshold, so as to switch off the switch unit, wherein the preset threshold is greater than a maximum value of an operating current flowing through the switch unit.

13. The power supply system circuit according to claim 12, wherein:

the current-limiting circuit is located in a first load branch of the at least two parallel load branches, and a load branch connected to the current-limiting circuit is the first load branch; or the at least two parallel load branches are connected to the power supply by using at least two power distribution units (PDUs), the current-limiting circuit is located in a first PDU of the at least two PDUs, and a load branch connected to the current-limiting circuit is the load branch connected to the first PDU.

14. The power supply system circuit according to claim 12, wherein the current-limiting circuit further comprises a unidirectional conduction unit and an inductor, and when the unidirectional conduction unit is on, a current flowing through the unidirectional conduction unit flows in a direction from a positive electrode of the unidirectional conduction unit to a negative electrode of the unidirectional conduction unit;

the positive electrode of the unidirectional conduction unit is connected to the negative electrode of the power supply of the voltage pre-regulator circuit in the load branch connected to the current-limiting circuit;

the negative electrode of the unidirectional conduction unit is connected to the positive electrode of the power supply of the voltage pre-regulator circuit in the load branch connected to the current-limiting circuit; and one end of the inductor is connected to the negative electrode of the unidirectional conduction unit, and the other end is connected to the positive electrode of the power supply of the voltage pre-regulator circuit in the load branch connected to the current-limiting circuit.

15. The power supply system circuit according to claim 12, wherein the current-limiting circuit is located in a first load branch of the at least two parallel load branches, and when the voltage pre-regulator circuit is a boost circuit, the inductor is integrated with an inductor of the voltage pre-regulator circuit.

16. The power supply system circuit according to claim 12, wherein:

the control circuit is further configured to output another control signal to the control end after a first preset time period after the switch unit is switched off, so that the switch unit enters a hiccup current-limiting state, wherein the first preset time period is less than or equal to a time period in which the inductor supplies, when the switch unit is switched off and by using electric energy stored in the inductor, power to a load in the load branch connected to the current-limiting circuit.

17. The power supply system circuit according to claim 12, wherein:

a bus of the power supply supplies power to the control circuit.

18. The power supply system circuit according to claim 12, wherein the switch unit is a field effect transistor or a power transistor.

\* \* \* \* \*